US011018883B2

(12) United States Patent
Chandran et al.

(10) Patent No.: US 11,018,883 B2
(45) Date of Patent: May 25, 2021

(54) COMMUNICATION SYSTEM WITH COMMUNICATION MECHANISM AND METHOD OF OPERATION THEREOF

(71) Applicant: Telenav, Inc., Santa Clara, CA (US)

(72) Inventors: Rohan Koduvayur Krishnan Chandran, Sunnyvale, CA (US); Ryan John Sullivan, San Jose, CA (US); Yogesh Agrawal, Fremont, CA (US)

(73) Assignee: Telenav, Inc., Santa Clara, CA (US)

( * ) Notice: Subject to any disclaimer, the term of this patent is extended or adjusted under 35 U.S.C. 154(b) by 6 days.

(21) Appl. No.: 15/581,845

(22) Filed: Apr. 28, 2017

(65) Prior Publication Data

US 2018/0316733 A1 Nov. 1, 2018

(51) Int. Cl.
  *H04L 29/06* (2006.01)
  *H04L 12/18* (2006.01)
  *H04L 29/08* (2006.01)
  *H04L 12/58* (2006.01)

(52) U.S. Cl.
  CPC ...... *H04L 12/1827* (2013.01); *H04L 65/1069* (2013.01); *H04L 65/403* (2013.01); *H04L 67/18* (2013.01); *H04L 67/2823* (2013.01); *H04L 51/04* (2013.01); *H04L 51/20* (2013.01)

(58) Field of Classification Search
  CPC . H04L 65/4053; H04L 12/1827; H04L 67/18; H04L 29/06176; H04L 12/18; H04L 65/00; H04L 65/1069; H04L 65/403; H04L 67/2823; H04L 51/04; H04L 51/20
  See application file for complete search history.

(56) References Cited

U.S. PATENT DOCUMENTS

| 7,007,235 | B1 * | 2/2006 | Hussein | G06Q 10/10 715/751 |
| 8,681,203 | B1 * | 3/2014 | Yin | H04N 7/15 348/14.08 |
| 9,350,869 | B1 * | 5/2016 | Lasser | H04M 3/563 |
| 2004/0109023 | A1 * | 6/2004 | Tsuchiya | A63F 13/12 715/758 |
| 2007/0237099 | A1 * | 10/2007 | He | H04L 12/1822 370/260 |
| 2010/0274796 | A1 * | 10/2010 | Beauregard | H04L 12/1822 707/769 |
| 2011/0055309 | A1 * | 3/2011 | Gibor | G06Q 30/02 709/202 |
| 2013/0176910 | A1 * | 7/2013 | Gorti | H04M 3/56 370/260 |
| 2014/0222429 | A1 * | 8/2014 | DeLand | G10L 15/08 704/251 |
| 2014/0280631 | A1 * | 9/2014 | Torgersrud | H04L 51/34 709/206 |
| 2015/0039691 | A1 * | 2/2015 | Sharma | H04L 65/1016 709/204 |

(Continued)

*Primary Examiner* — Kibrom T Hailu

(74) *Attorney, Agent, or Firm* — Perspectives Law Group, Corp.

(57) ABSTRACT

A communication system includes: a control unit configured to: connect a system user with channel participant in an anonymous voice chat session; determine a participant distance for the channel participant relative to the system user; adjust a volume level for a verbal communication of the channel participant based on the participant distance; and a communication unit, coupled to the control unit, to transmit the verbal communication.

20 Claims, 5 Drawing Sheets

(56) References Cited

U.S. PATENT DOCUMENTS

| | | | |
|---|---|---|---|
| 2015/0195692 A1* | 7/2015 | Chow | H04M 19/04 |
| | | | 455/414.1 |
| 2016/0100060 A1* | 4/2016 | Fahlgren | H04M 3/523 |
| | | | 379/266.01 |
| 2016/0105500 A1* | 4/2016 | Anchan | H04L 67/1051 |
| | | | 370/329 |
| 2016/0286049 A1* | 9/2016 | Guo | H04M 3/566 |
| 2016/0344805 A1* | 11/2016 | Burba | H04L 67/1004 |
| 2017/0099390 A1* | 4/2017 | Crowe | H04M 3/5233 |
| 2017/0123752 A1* | 5/2017 | Nadler | G06F 3/165 |
| 2017/0237785 A1* | 8/2017 | Peng | H04L 65/403 |
| | | | 709/206 |
| 2017/0359666 A1* | 12/2017 | Lyren | H04S 7/30 |
| 2018/0018646 A1* | 1/2018 | Al Refae | G06Q 20/1085 |
| 2018/0035363 A1* | 2/2018 | Gupta | H04W 48/16 |

* cited by examiner

COMMUNICATION SYSTEM WITH COMMUNICATION MECHANISM AND METHOD OF OPERATION THEREOF

TECHNICAL FIELD

An embodiment of the present invention relates generally to a communication system, and more particularly to a system for anonymous communication.

BACKGROUND

Modern consumer and industrial electronics, especially devices such as cellular phones, smart phones, tablet computers, vehicle integrated computing and communication systems, portable digital assistants, and combination devices, are providing increasing levels of functionality to support modern life including communication services. Research and development in the existing technologies can take a myriad of different directions.

As devices improve multimedia communication capabilities, social networks and communication services have increase offerings and support for verbal communication in group communication sessions. However, preservation of user privacy during the communication sessions has become a growing concern for users.

Thus, a need still remains for a communication system with an anonymous communication mechanism to speak with groups of individuals. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a system, including: a control unit configured to: connect a system user with chat participants in an anonymous voice chat channel; determine a participant distance for the chat participants relative to the system user; adjust a volume level for a verbal communication of the chat participants based on the participant distance; and a communication unit, coupled to the control unit, to transmit the verbal communication.

An embodiment of the present invention provides a method including: connecting a system user with chat participants in an anonymous voice chat channel; determining a participant distance for the chat participants relative to the system user; and adjusting a volume level for a verbal communication of the chat participants based on the participant distance.

An embodiment of the present invention provides a non-transitory computer readable medium including: connecting a system user with chat participants in an anonymous voice chat channel; determining a participant distance for the chat participants relative to the system user; and adjusting a volume level for a verbal communication of the chat participants based on the participant distance.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
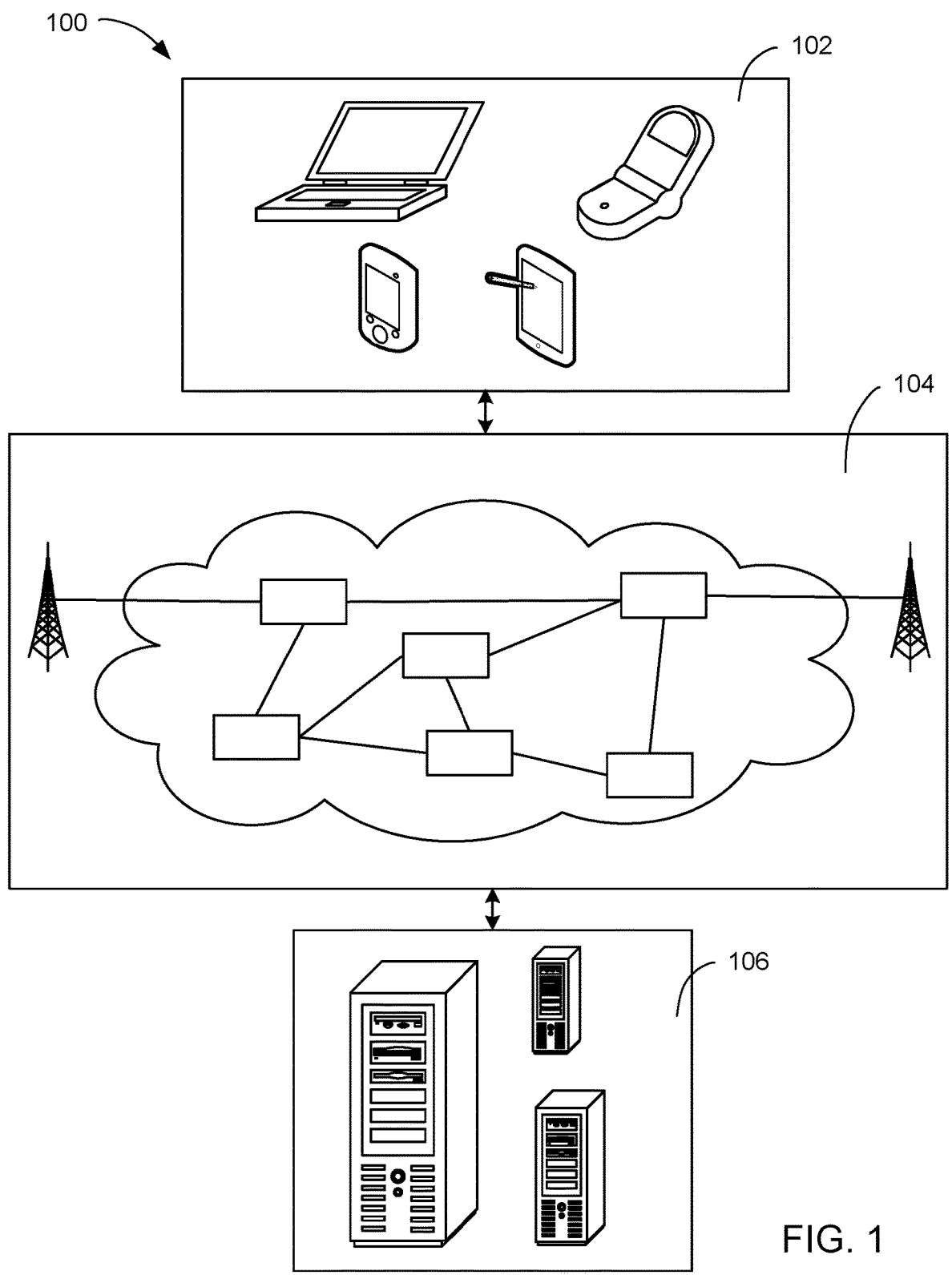
FIG. 1 is a communication system with anonymous communication mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

The modules in the following description of the embodiments can be coupled to one other as described or as shown. The coupling can be direct or indirect without or with, respectively, intervening items between coupled items. The coupling can be physical contact or by communication between items.

Referring now to FIG. 1, therein is shown a communication system 100 with anonymous communication mechanism in an embodiment of the present invention. The communication system 100 includes a first device 102, such as a client or a server, connected to a second device 106, such as a client or a server. The first device 102 can communicate with the second device 106 with a communication path 104, such as a wireless or wired network.

For example, the first device 102 can be of any of a variety of devices, such as a smart phone, cellular phone, personal digital assistant, tablet computer, a notebook computer, laptop computer, desktop computer, or a vehicle integrated communication system. The first device 102 can couple, either directly or indirectly, to the communication path 104 to communicate with the second device 106 or can be a stand-alone device.

The second device 106 can be any of a variety of centralized or decentralized computing devices. For example, the second device 106 can be a laptop computer, a desktop computer, a video game console, grid-computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the communication path 104 to communicate with the first device 102.

For illustrative purposes, the communication system 100 is described with the second device 106 as a computing device, although it is understood that the second device 106 can be different types of devices. Also for illustrative purposes, the communication system 100 is shown with the second device 106 and the first device 102 as end points of the communication path 104, although it is understood that the communication system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
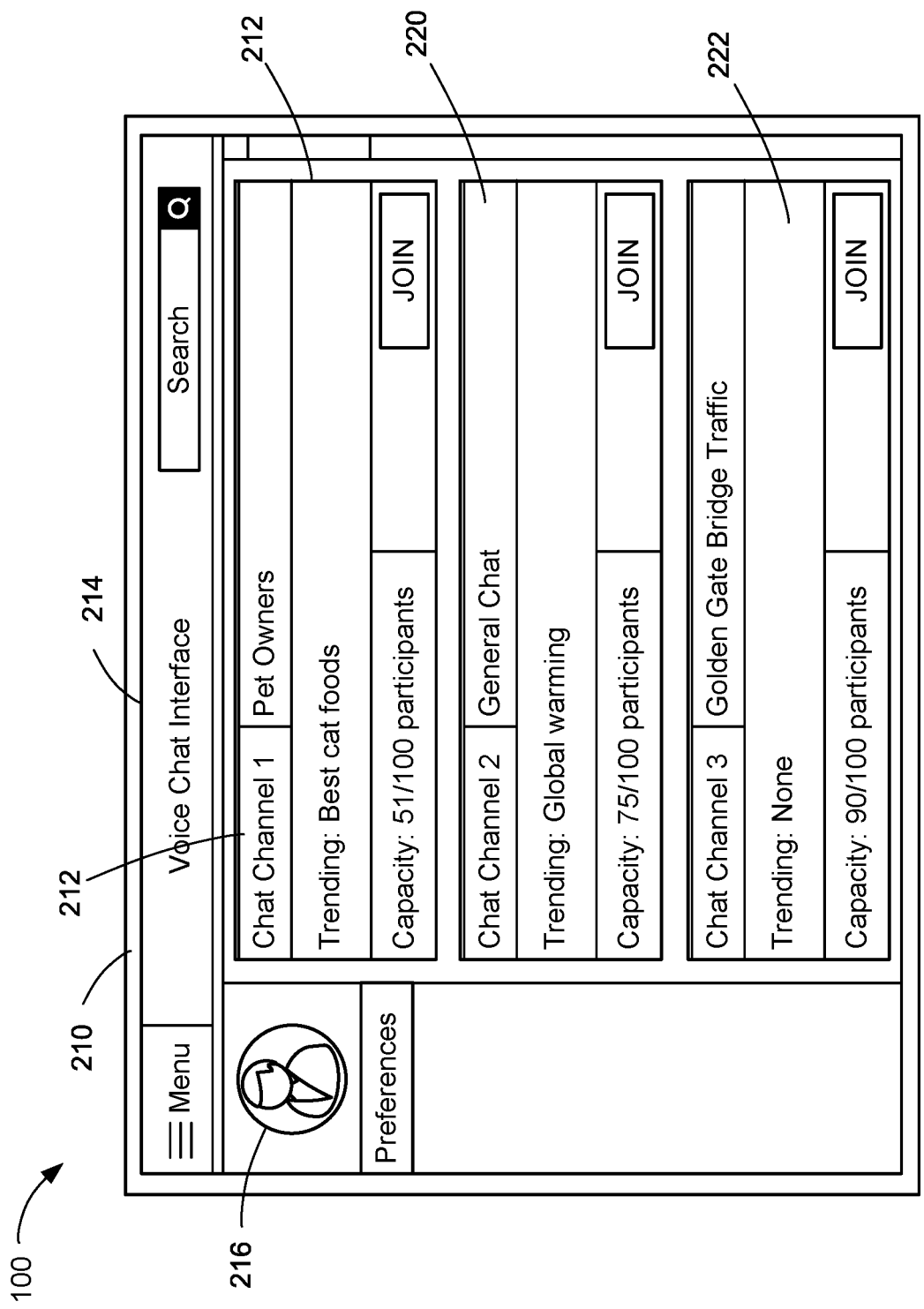
FIG. 2 is an example of a display interface of the first device of FIG. 1.

Referring now to FIG. 2, therein is shown an example of a display interface 210 of the first device 102 of FIG. 1. The display interface 210 depicts a voice chat interface 214. The voice chat interface 214 can be a graphical user interface that can enable a system user 216 to join an anonymous voice chat session 212 with other users of the communication system 100. Anonymous voice chat can be provided by masking or hiding the identity of the participants, such as through voice alteration of the system user 216.

The communication system 100 can enable the system user 216 to engage in anonymous voice or audio based communication with participants of a voice chat channel 218 through the voice chat interface 214. The voice chat interface 214 can be populated with multiple instances of the voice chat channel 218. Each of the multiple instances of the voice chat channel 218 be designated with a channel theme 220, which can be displayed on the voice chat interface 214. The channel theme 220 is a general description of the topic or subject matter being discussed in the voice chat channel 218. For example, the channel theme 220 can vary widely from broad subjects, such as history, weather, to specific subjects, such as a celebrity or current event.

The voice chat interface 214 can include trending topics 222 for the voice chat channel 218. The trending topics are topics that are currently being discussed by one or more of the participants within the voice chat channel 218.

The components and visual elements of the voice chat interface are depicted by way of example and for illustrative purposes. It is understood that the interface can be arranged or presented differently.

Access to the voice chat channel 218 can be restricted or unrestricted. For example, the voice chat channel 218 that is unrestricted can be public and allows anyone to join. Conversely, the voice chat channel 218 that is restricted can be protected by a password or only available to those that are granted access. Details of the access restrictions to the voice chat channel 218 will be discussed below.

Figure 3:
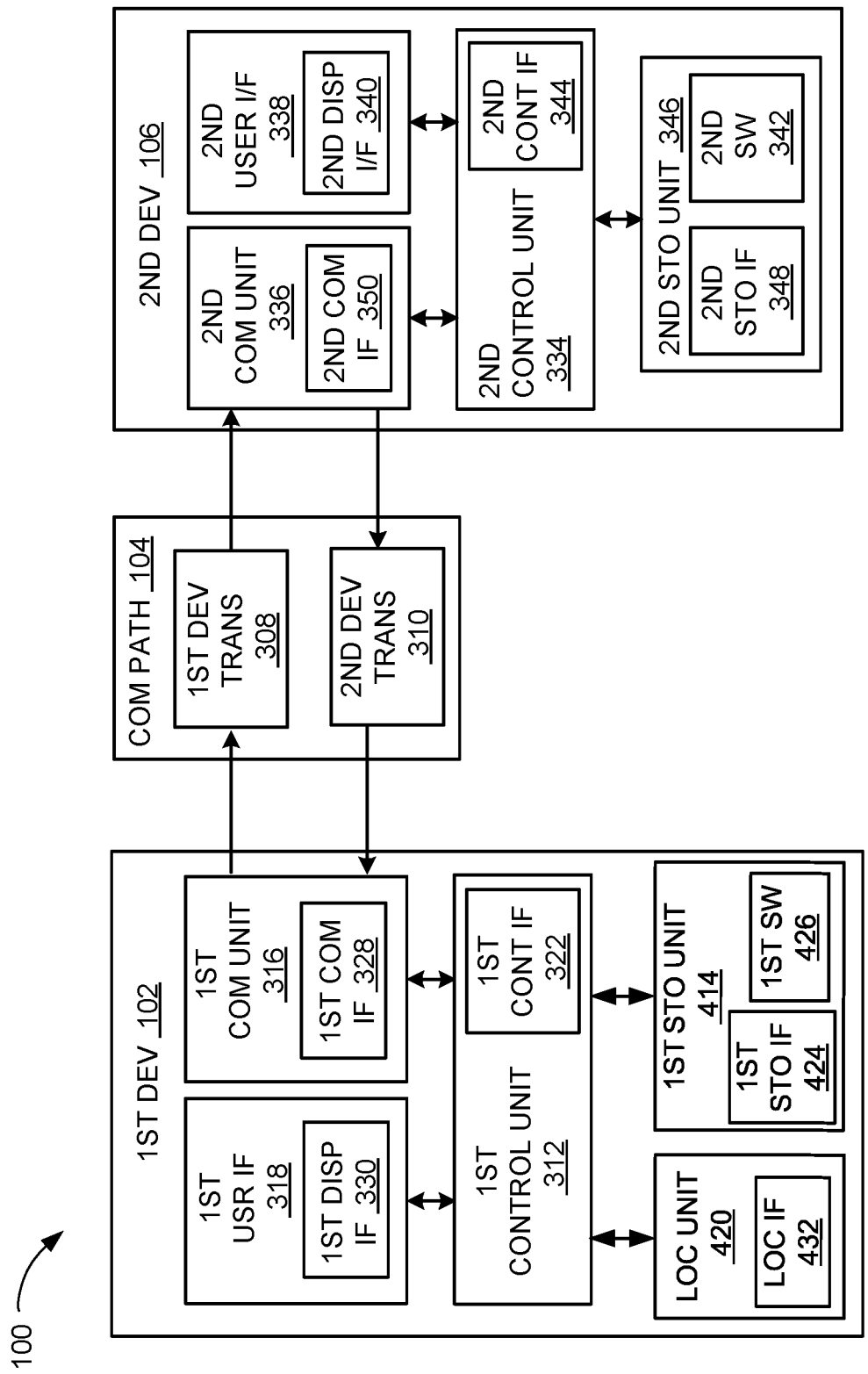
FIG. 3 is an exemplary block diagram of the communication system.

Referring now to FIG. 3, therein is shown an exemplary block diagram of the communication system 100. The communication system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the communication system 100 is shown with the first device 102 as a client device, although it is understood that the communication system 100 can have the first device 102 as a different type of device. For example, the first device 102 can be a server having a display interface.

Also for illustrative purposes, the communication system 100 is shown with the second device 106 as a server, although it is understood that the communication system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, a first user interface 318, and a location unit 320. The first control unit 312 can include a first control interface 322. The first control unit 312 can execute a first software 326 to provide the intelligence of the communication system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as information about the system user 216, the voice chat channel 218, such as the channel theme 220 or the trending topics 222, or a combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the communication system 100. The first control unit 312 can also execute the first software 326 for the other functions of the communication system 100. The first control unit 312 can further execute the first software 326 for interaction with the communication path 104 via the first communication unit 316.

The location unit 320 can generate location information, current heading, and current speed of the first device 102, as examples. The location unit 320 can be implemented in many ways. For example, the location unit 320 can function as at least a part of a global positioning system (GPS) and can include components, such as a GPS receiver; an inertial navigation system, a cellular-tower location system, a pressure location system, or any combination thereof.

The location unit 320 can include a location interface 332. The location interface 332 can be used for communication between the location unit 320 and other functional units in the first device 102. The location interface 332 can also be used for communication that is external to the first device 102.

The second device 106 can be optimized for implementing an embodiment of the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the communication system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the communication system 100, including operating the second communication unit 336 to communicate with the first device 102 over the communication path 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the communication system 100 is shown with the second storage unit 346 as a single hierarchy storage system, although it is understood that the communication system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The communication system 100 can be executed by the first control unit 312, the second control unit 334, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units.

The second device 106 can work individually and independently from the first device 102 and the communication path 104.

For illustrative purposes, the communication system 100 is described by operation of the first device 102 and the second device 106. It is understood that the first device 102 and the second device 106 can operate any of the modules and functions of the communication system 100.

Figure 4:
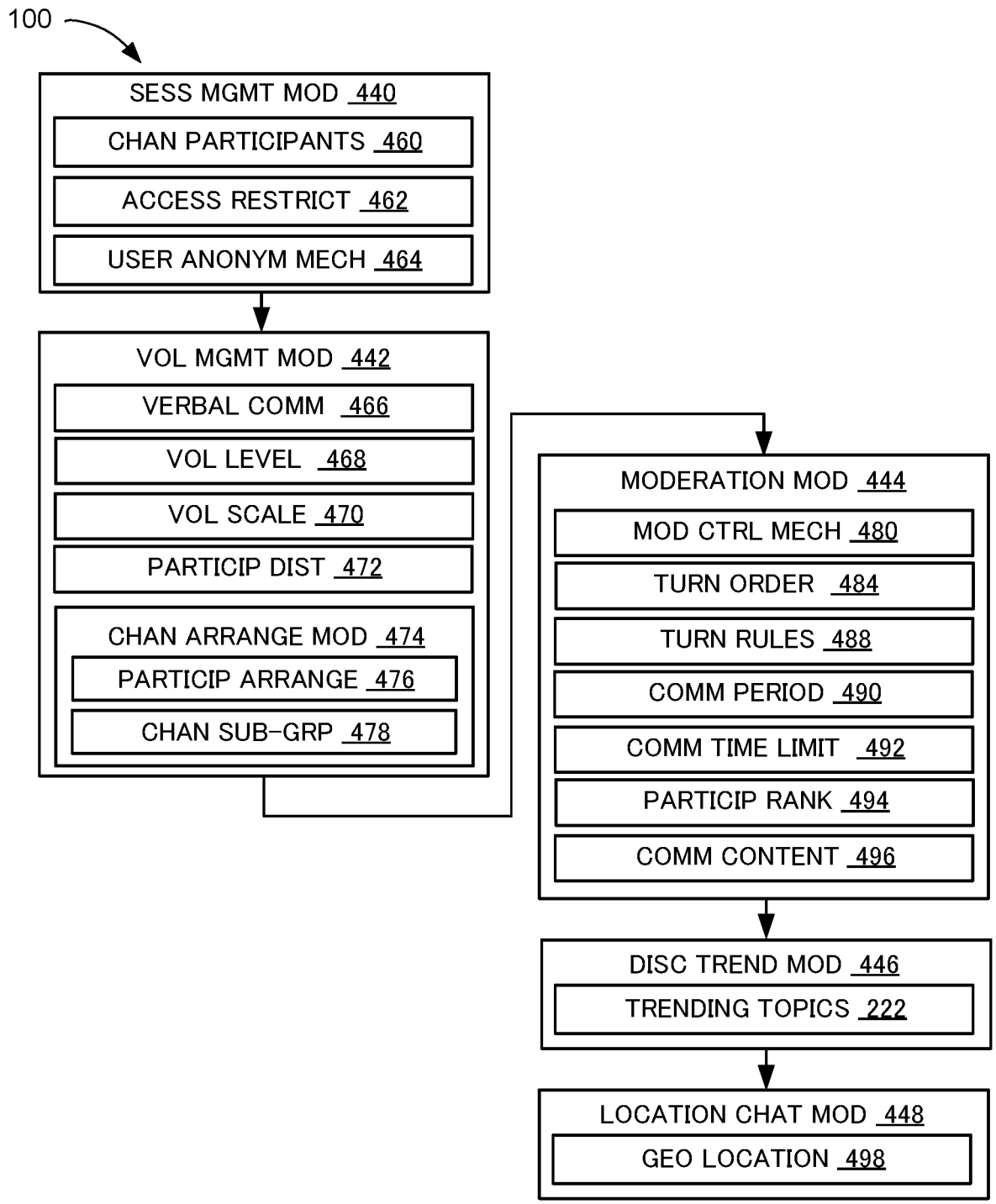
FIG. 4 is a control flow of the communication system.

Referring now to FIG. 4, therein is shown a control flow of the communication system 100. The communication system 100 can include a session management module 440, a volume management module 442, a moderation module 444, a discussion trend module 446, and a location chat module 448. The volume management module 442 can be coupled to the session management module 440. The moderation module 444 can be coupled to the volume management module 442. The discussion trend module 446 can be coupled to the moderation module 444. The location chat module 448 can be coupled to the discussion trend module 446.

The session management module 440 is for providing information about the voice chat channel 218 of FIG. 2 and connecting the system user 216 of FIG. 2 to the voice chat channel 218. For example, the session management module 440 can provide information about the voice chat channel 218 by populating and updating the voice chat interface 214 of FIG. 2 with information about each instance of the voice chat channel 218, such as the number of the channel participants 460 of FIG. 2, the channel theme 220 of FIG. 2, the trending topics 222 of FIG. 2, access restrictions 462, or a combination thereof.

The access restrictions 462 can be a designation for accessibility to the voice chat channel 218. For example, the access restrictions 462 can be designated as public, with no restrictions to access, or private, which can require a password for access to the voice chat channel 218. As another example, the access restrictions 462 can include secret or hidden rooms that are will not appear on the voice chat interface 214 of FIG. 2 unless the system user 216 is given permission or access.

The session management module 440 can enable the system user 216 to join one of a plurality of the voice chat channel 218 through the voice chat interface 214. For example, the system user 216 can select the voice chat channel 218 presented on the voice chat interface 214, which can be received by the session management module 440. In another example, the session management module 440 can automatically place the system user 216 into one of a plurality of the voice chat channel 218, such as a general chat room or room without a specific instance of the channel theme 220. In a further example, the session management module 440 can enable the system user 216 to begin a new instance of the voice chat channel 218. The session management module 440 can implement the user interface of the device of the system user 216, such as the first user interface 312 of FIG. 3 for the first device 102, to indicate which of the channel participants 460 is engaged in verbal communication 466, such as making sounds or speaking, in the voice chat channel 218. For example, the session management module 440 can present an interface or display with a representation or identifier, such as a name or avatar, for all the channel participants 460 in the voice chat channel 218. To continue the example, an icon or graphic in the interface or display for the voice chat channel 218 can be displayed next to the representation or identifier of each of the channel participants 460 that are engaging in the verbal communication 466.

The session management module 440 can implement a user anonymity mechanism 464 for the system user 216. The user anonymity mechanism 464 is a privacy measure or mechanism to mask or obscure the identity or identifying features of the system user 216, such as the voice or name of the system user 216. As an example, the user anonymity mechanism 464 can include a voice alteration mechanism or name change mechanism.

In general, the voice chat channel 218 can enable the channel participants 460 to speak freely and anonymously with the other ones of the channel participants 460. However, the overlapping sounds of the verbal communication 466 from a plurality of the channel participants 460 can disrupt the ability of the system user 216 to communicate with the other ones of the channel participants 460. The communication system 100 can implement the volume management module 442 to manage a volume level 468 of the channel participants 460 with respect to the system user 216. More specifically, the volume management module 442 can adjust the volume level 468 of the verbal communication 466 in the voice chat channel 218 to facilitate the verbal communication 466 between the system user 216 and the channel participants 460.

In one implementation, the volume management module 442 can determine the volume level 468 for the channel participants 460 with a volume scale 470 based on a participant distance 472. The volume scale 470 is a range of volume settings. For example, the top of the volume scale 470 provides the highest volume and the bottom of the volume scale 470 provides the lowest volume.

The participant distance 472 is a virtual distance for scaling the volume level 468 of the verbal communication 466 for the channel participants 460. For example, a low value of the participant distance 472 can represent close virtual proximity to the system user 216 and a high value of the participant distance 472 represents a greater virtual distance from the system user 216. As an illustration, the voice chat channel 218 can represent a virtual room with fix virtual spaces or positions, such as an arranged of virtual tables and chairs, that can be virtually occupied by each of the channel participants 460 and the system user 216. In this illustration, the participant distance 472 can represent a virtual distance between the system user 216 and channel participants 460 positioned within the voice chat channel 218, such as the virtual distances between the positions in the virtual room.

The volume management module 442 can determine the participant distance 472 with a channel arrangement module 474. The channel arrangement module 474 can determine the participant distance 472 based on a participant arrangement 476 of the channel participants 460 within the voice chat channel 218. The participant arrangement 476 is a virtual placement of the channel participants 460 with respect to the system user 216. For example, the participant arrangement 476 can represent the fixed virtual positions to be filled by the channel participants 460 within the voice chat channel 218. The participant arrangement 476 can be a uniform virtual placement or can be a grouping or cluster of virtual placements, such as seats around a virtual table. Further, the volume management module 442 can determine the participant distance 472 as new ones of the channel participants 460 join the voice chat channel 218.

In an implementation, the channel arrangement module 474 can arrange the channel participants 460 into multiple instances of a channel sub-group 478. The channel sub-group 478 is a grouping of a number of the channel participants 460. The channel sub-group 478 can facilitate the verbal communication 466 for the channel participants 460 in the channel sub-group 478. For example, the channel arrangement module 474 can determine the participant distance 472 between each of the channel participants 460 as a lower value than the participant distance 472 for the channel participants 460 outside of the channel sub-group 478. Further, the session management module 440 can display the channel participants 460 according the channel sub-groups 478 through the first user interface 312.

In general, the communication system 100 can transmit the verbal communication 466 of each of the channel participants 460 to the device, such as the first device 102, of the system user 216 such that each of instance of the verbal communication 466 can be emitted from the user interface, such as a speaker or head set of the first user interface 318 for the first device 102. The communication system 100 can implement the volume management module 442 to adjust the volume for each instance of verbal communication 466 for each of the channel participants 460 to simulate volume based on proximity to the system user 216. For example, the volume management module 442 can correlate the participant distance 472 with the volume scale 470 to adjust the volume level 468 for each of the channel participants 460 relative to the system user 216. More specifically, the channel participant 460 determined to have the maximum value of the participant distance 472 can have the lowest value of the volume level 468 while the channel participant determined to have the lowest value of the participant distance 472 can have the highest value of the volume level 468. For example, the channel participants 460 in the same instance of the channel sub-group 478 as the system user 216 can be assigned the highest value of the volume level 468 since the channel participants 460 in the channel sub-group 478 have the lowest value of the participant distance 472. Conversely, for example, the channel participants 460 outside the channel sub-group 478 of the system user 216 can be assigned lower values of the volume level 468 since the channel participants 460 outside the channel sub-group 478 have the higher values of the participant distance 472 representing a further virtual distance from the system user 216. In addition, the volume management module 442 can implement audio effects to the verbal communication 466 of the channel participants 460 in the channel sub-group 478 different from the system user 216. For example, the volume management module 442 can implement a sound muting or dampening effect to reduce the clarity of the verbal communication 466.

The communication system 100 can moderate the channel participants 460 of the voice chat channel 218 with the moderation module 444. More specifically, the moderation module 444 can implement a moderation control mechanism 480 for the verbal communication 466 of the channel participants 460. The moderation control mechanism 480 can include the capability to add or remove restrictions to the verbal communication 466 of the channel participants 460. More specifically, the moderation control mechanism 480 can set a time limit, modify a time limit, or combination thereof for the verbal communication 466, determine and manage a queue for the verbal communication 466, determine rankings or ratings for the channel participants 460, or a combination thereof.

In one implementation, the moderation control mechanism 480 can include a turn order 484 for the channel participants 460 in a speech queue 486. The speech queue 486 is an ordering that determines when the channel participants 460 can engage in verbal communication 466 within the voice chat channel 218. The turn order 484 is the position within the speech queue 486. The moderation control mechanism 480 including the turn order 484 can enable the moderation module 444 to assign each of the channel participants 460 the turn order 484 in the speech queue 486 and allow the channel participants 460 to speak when the speech queue 486 reaches the turn order 484 for the channel participants 460.

The speech queue 486 can be modified by turn rules 488. The turn rules 488 are rules for modifying the turn order 484 of the channel participants 460. For example, if one of the channel participants 460 responds to or directly addresses another one of the channel participants 460, that particular one of the channel participants 460 can be given an opportunity to respond. To continue the example, the moderation module 444 can implement the moderation control mechanism 480 to modify the turn order 484 of the channel participant 460 directly addressed in the verbal communication 466 of another one of the channel participants 460 to be next in the speech queue 486 in order to respond.

In another implementation, the moderation control mechanism 480 can include a communication time limit 492 on length of time for verbal communication 466 of the channel participants 460. The communication time limit 492 is the time limit one of the channel participants is allotted for verbal communication 466. The moderation control mechanism 480 of the communication time limit 492 can enable the moderation module 444 to set the amount of time each of the channel participants 460 have for the verbal communication 466 to address the voice chat channel 218.

In a further implementation, the moderation control mechanism 480 can include a participant rank 494. The participant rank 494 is a peer based ranking system of a communication content 496 of the verbal communication 466 for each of the channel participants 460. For example, each of the channel participants 460 can begin the join the voice chat channel 218 with a neutral value of the participant rank 494. To continue the example, the channel participants 460 can up-vote to increase the participant rank 494 or down-vote to reduce the participant rank 494 during or after verbal communication 466 for one of the channel participants 460.

The moderation control mechanism 480 of the participant rank 494 can enable the moderation module 444 to modify the communication time limit 492 for each of the channel participants 460. For example, the individuals of the channel participants 460 having a higher value of the participant rank 494 can have the communication time limit 492 increased based on the participant rank 494 while those having a lower value of the participant rank 494 can have the communication time limit 492 reduced.

The moderation control mechanism 480 can also be personalized for the system user 216. For example, the personalized instances of the moderation control mechanism 480 can be settings that only affect the incoming sounds or speech for the system user 216. As a specific example, the moderation control mechanism 480 can allow the system user 216 to mute individuals of the channel participants 460. In another specific example, the personalized instances of the moderation control mechanism 480 can enable the system user 216 to increase the volume level 468 for one of the channel participants 460 that the system user 216 prefers to listen to or communicate with.

The communication system 100 can determine the trending topics 222 within the voice chat channel 218 with the discussion trend module 446. The discussion trend module 446 can determine the trending topics 222 based on the verbal communication 466 of the channel participants 460.

For example, the discussion trend module 446 can analyze the verbal communication 466 by implementing a speech recognition algorithm to analyze the communication content 496 of the verbal communication 466 to determine patterns and repeated words or phrases. More specifically, the discussion trend module 446 can analyze the communication content 496 of a plurality of the channel participants 460 to determine the trending topics 222. For example, the discussion trend module 446 can analyze the communication content 496 to identify the communication content 496 that is repeated or common in the verbal communication 466 of the channel participants 460. As a specific example, the discussion trend module 446 can determine the trending topics 222 for the different instances of the channel sub-group 478 by analyzing the communication content 496 of the verbal communication 466 for the channel participants 460, as described above. To continue the specific example, the communication system 100 can display the trending topics 222 for the voice chat channel 218 as a whole, for one or more instances of the channel sub-group 478 in the voice chat channel 218, or a combination thereof through the first user interface 312.

The communication system 100 can enable the voice chat channel 218 based on a geographic location 498 with the location chat module 448. In an example implementation, the location chat module 448 can generate the voice chat channel 218 specific to the geographic location 498 or area around the geographic location 498. For example, the geographic location 498 can be associated with an event, such as an area around a traffic accident or a sports stadium or arena.

As an example, in this implementation, the channel arrangement module 474 and the volume management module 442 can respectively set the participant distance 472 and the volume level 468 based on the physical distances between the system user 216 and the channel participants 460. For instances, the channel participants 460 that are physically closer to a physical location of the system user 216 can have a lower value of the participant distance 472 to reflect the physical proximity to the system user 216. The participant distance 472 and the volume level 468 of the channel participants 460 can be dynamic as the relative physical locations of the channel participants 460 change. In this implementation, the location chat module 448 can implement the GPS receiver within the location unit 320 of FIG. 3 for the first device 102 to determine the physical location of the system user 216 to determine the participant distance 472.

It has been discovered that the communication system 100 provides improved group communication capabilities with the participant distance 472. The participant distance 472 enable the communication system 100 to adjust the volume level 468 for the verbal communication 466 of the channel participants 460, which facilitates communication for the system user 216 by allowing the system user 216 distinguish voices and sounds based on the participant distance 472, which improves group communication abilities between the system user 216 and the channel participants 460.

The communication system 100 can transmit and receive the verbal communication 466 of the system user 216, the channel participants 460, or a combination thereof. For example, the first device 102 of FIG. 1 can transmit the verbal communication 466 of the system user 216 with the first communication unit 316 to the second device 106 of FIG. 1, which can be received by the second communication unit 336 of FIG. 3. As another example, the second communication unit 336 can transmit the verbal communication 466 of the channel participants 460 to the first device 102, which can be received by the first communication unit 316.

The communication system 100 has been described with module functions or order as an example. The communication system 100 can partition the modules differently or order the modules differently. For example, the first software 326 of FIG. 3 of the first device 102 of FIG. 3 can include the modules for the communication system 100. As a specific example, the first software 326 can include the session management module 440, the voice management module 442, the moderation module 444, the discussion trend module 446, the location chat module 448, and associated sub-modules included therein.

The first control unit 312 of FIG. 3 can execute the first software 326 to operate the modules. For example, the first control unit 312 can implement the session management module 440, the voice management module 442, the moderation module 444, the discussion trend module 446, the location chat module 448, or a combination thereof and the associated functions and operations for each of the modules described above.

In another example of module partitions, the second software 342 of FIG. 3 of the second device 106 of FIG. 3 can include the modules for the communication system 100. As a specific example, the second software 342 can include the session management module 440, the voice management module 442, the moderation module 444, the discussion trend module 446, the location chat module 448 and associated sub-modules included therein.

The second control unit 334 of FIG. 3 can execute the second software 342 or implement the device smart agent 218 to operate the modules. For example, the second control unit 334 can implement the session management module 440, the voice management module 442, the moderation module 444, the discussion trend module 446, the location chat module 448, or a combination thereof.

The communication system 100 has been described with module functions or order as an example. The communication system 100 can partition the modules differently or order the modules differently. For example, the discussion trend module 446 can be coupled to the session management module 440 to provide the trending topics 222 for the voice chat interface 214.

The modules described in this application can be hardware implementation or hardware accelerators in the first control unit 316 of FIG. 3 or in the second control unit 338 of FIG. 3. The modules can also be hardware implementation or hardware accelerators within the first device 102 or the second device 106 but outside of the first control unit 316 or the second control unit 338, respectively, as depicted in FIG. 3. However, it is understood that the first control unit 316, the second control unit 338, or a combination thereof can collectively refer to all hardware accelerators for the modules.

The modules described in this application can be implemented as instructions stored on a non-transitory computer readable medium to be executed by a first control unit 312, the second control unit 336, or a combination thereof. The non-transitory computer medium can include the first storage unit 314 of FIG. 3, the second storage unit 346 of FIG. 3, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the communication system 100 or installed as a removable portion of the communication system 100.

Figure 5:
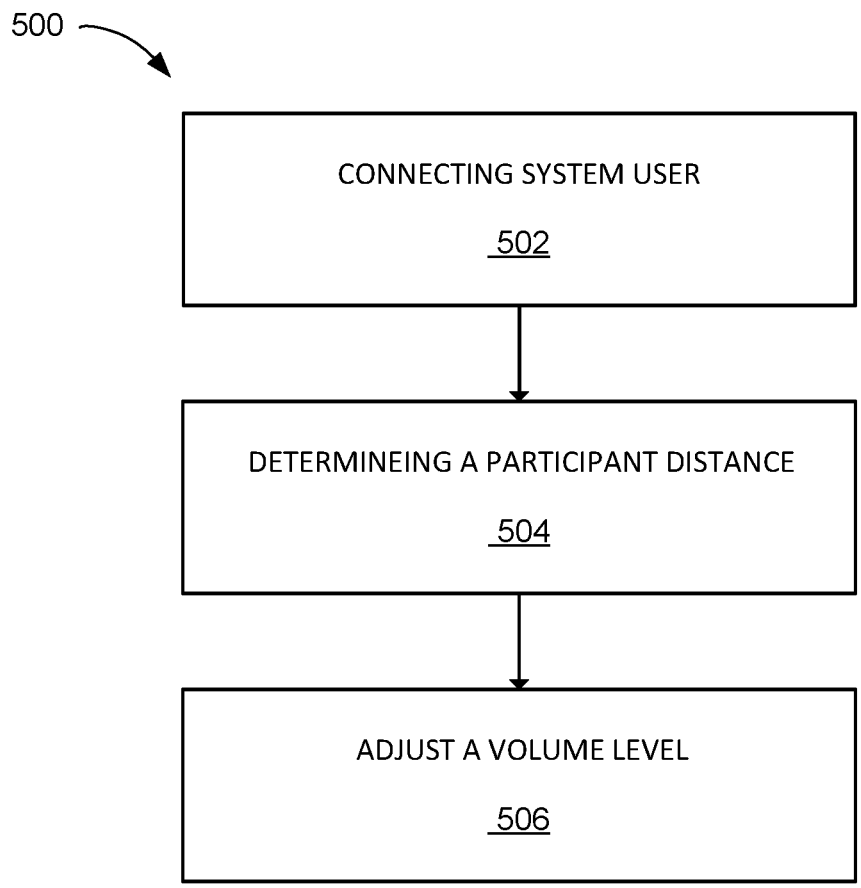
FIG. 5 is a flow chart of a method of operation of a communication system in an embodiment of the present invention.

Referring now to FIG. 5, therein is shown a flow chart of a method 500 of operation of a communication system 100 in an embodiment of the present invention. The method 500 includes: connecting a system user with chat participants in an anonymous voice chat channel in a block 502; determining a participant distance for the chat participants relative to the system user in a block 504; and adjusting a volume level for a verbal communication of the chat participants based on the participant distance in a block 506.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A communication system comprising:
    a control unit configured to:
        connect a system user with a channel participant in a channel sub-group of an anonymous voice chat session, wherein the channel participant includes a participant rank as a peer based ranking of a communication content of the channel participant, for modifying a communication time limit for the channel participant, and modify a turn order in a speech queue;
        determine a participant distance as a virtual distance for the channel participant relative to the system user;
        adjust a volume level for a verbal communication of the channel participant based on the participant distance;
        implement a sound dampening effect to reduce the clarity of the verbal communication of an instance of the channel sub-group different from the channel sub-group of the system user;
        determine a trending topic for the different instances of the channel sub-group by analyzing the communication content that is repeated or common in the verbal communication in the channel sub-group; and
        generate a display of the trending topic on each of the different instances of the channel sub-group with the anonymous voice chat session available for selection by the system user; and
    a communication unit, coupled to the control unit, to transmit the verbal communication.

2. The system as claimed in claim 1 wherein the control unit is configured to determine the trending topic for a voice chat channel including multiple instances of the channel sub-group to display the trending topic for the multiple instances of the channel sub-group through a user interface.

3. The system as claimed in claim 1 wherein the control unit is configured to generate a voice chat channel based on a geographic location.

4. The system as claimed in claim 1 wherein the control unit is configured to enable an access restriction for a voice chat channel.

5. The system as claimed in claim 1 wherein the control unit is configured to provide a moderation control mechanism for the channel participant with respect to the system user.

6. The system as claimed in claim 1 wherein the control unit is configured to arrange the system user into the channel sub-group with the channel participants, including to display the channel participant according to the sub-group on a device.

7. The system as claimed in claim 1 wherein the control unit is configured to provide a moderation control mechanism based on the participant rank.

8. The system as claimed in claim 1 wherein the control unit is configured to provide a moderation control mechanism including the communication time limit.

9. The system as claimed in claim 1 wherein the control unit is configured to provide a moderation control mechanism including a speech queue.

10. The system as claimed in claim 1 wherein the control unit is configured to implement a user anonymity mechanism for the system user with a voice alteration mechanism.

11. A method of operation of a communication system comprising:
    connecting a system user with a channel participant in a channel sub-group of an anonymous voice chat session, wherein the channel participant includes a participant rank as a peer based ranking of a communication content of the channel participant, for modifying a communication time limit for the channel participant, and modifying a turn order in a speech queue;
    determining a participant distance as a virtual distance for the channel participant relative to the system user;
    adjusting a volume level for a verbal communication of the channel participant based on the participant distance;
    implementing a sound dampening effect to reduce the clarity of the verbal communication of an instance of the channel sub-group different from the channel sub-group of the system user;
    determining a trending topic for the different instances of the channel sub-group by analyzing the communication content that is repeated or common in the verbal communication of the channel sub-group; and
    generating a display of the trending topic on each of the different instances of the channel sub-group with the anonymous voice chat session available for selection by the system user.

12. The method as claimed in claim 11 wherein determining the trending topic for a voice chat channel including multiple instances of the channel sub-group displaying the trending topic for the multiple instances of the channel sub-group through a user interface.

13. The method as claimed in claim 11 further comprising generating a voice chat channel based on a geographic location.

14. The method as claimed in claim 11 further comprising enabling an access restriction for a voice chat channel.

15. The method as claimed in claim 11 further comprising providing a moderation control mechanism for the channel participant with respect to the system user.

16. A non-transitory computer readable medium including instructions for operating a communication system comprising:
- connecting a system user with a channel participant in a channel sub-group of an anonymous voice chat session, wherein the channel participant includes a participant rank as a peer based ranking of a communication content of the channel participant, for modifying a communication time limit for the channel participant, and modifying a turn order in a speech queue;
- determining a participant distance as a virtual distance for the channel participant relative to the system user;
- adjusting a volume level for a verbal communication of the channel participant based on the participant distance;
- implementing a sound dampening effect to reduce the clarity of the verbal communication of an instance of the channel sub-group different from the channel sub-group of the system user;
- determining a trending topic for the different instances of the channel sub-group by analyzing the communication content that is repeated or common in the verbal communication of the channel sub-group; and
- generating a display of the trending topic on each of the different instances of the channel sub-group with the anonymous voice chat session available for selection by the system user.

17. The non-transitory computer readable medium as claimed in claim 16 wherein determining the trending topic for a voice chat channel including multiple instances of the channel sub-group displaying the trending topic for the multiple instances of the channel sub-group through a user interface.

18. The non-transitory computer readable medium as claimed in claim 16 further comprising generating the voice chat channel based on a geographic location.

19. The non-transitory computer readable medium as claimed in claim 16 further comprising enabling an access restriction for the voice chat channel.

20. The non-transitory computer readable medium as claimed in claim 16 further comprising providing a moderation control mechanism for the channel participant with respect to the system user.

* * * * *